United States Patent [19]
Meckes

[11] Patent Number: 5,961,442
[45] Date of Patent: Oct. 5, 1999

[54] CONTROL DEVICE FOR ADMITTING PRESSURE INTO ANTI-G PILOT

[75] Inventor: Rüdiger Meckes, Berkenthin, Germany

[73] Assignee: Dräger Aerospace GmbH, Lubeck, Germany

[21] Appl. No.: 09/103,254

[22] Filed: Jun. 23, 1998

[30] Foreign Application Priority Data

Dec. 3, 1997 [DE] Germany ............................ 197 53 580

[51] Int. Cl.[6] .............................. B64D 10/00; B64G 6/00
[52] U.S. Cl. ................................................................ 600/20
[58] Field of Search ........................ 600/19–20; 137/38, 137/39, 81

[56] References Cited

U.S. PATENT DOCUMENTS

| | | | |
|---|---|---|---|
| 4,583,522 | 4/1986 | Aronne | 600/20 |
| 4,736,731 | 4/1988 | Van Patten | 600/20 |
| 5,314,402 | 5/1994 | Foote et al. | 600/20 |

Primary Examiner—John P. Lacyk
Attorney, Agent, or Firm—McGlew and Tuttle, P.C.

[57] ABSTRACT

A control device for admitting compressed air into anti-g pilot pants to reduce the effects of forces of acceleration on the pilot. Flight maneuvers with rapid change from negative to positive acceleration shall be made possible by the present invention over a broader range than before. To achieve this, the control device is provided with control means (5–10, 13, 14) for detecting changes in acceleration from negative to positive values, which bring about an additional admission of pressure over a limited period of time with a profile decreasing over time at rates of acceleration change above a predetermined value. This design brings about an additional admission of pressure into the anti-g pilot pants during rapid load changes from negative to positive accelerations, so that an excessively rapid drainage of blood from the dilated blood vessels in the upper half of the body during such transitions can be counteracted by an additional admission of pressure into the anti-g pilot pants over a limited period of time. The control device advantageously operates with pneumatic control branches, which act via a valve control chamber (4) on a main valve (15), which sets the pressure at the controller outlet (12).

9 Claims, 1 Drawing Sheet

CONTROL DEVICE FOR ADMITTING PRESSURE INTO ANTI-G PILOT

FIELD OF THE INVENTION

The present invention pertains to a control device for admitting pressure into anti-g pilot pants, which control device has a control branch for detecting positive accelerations and is designed to cause the admission of increasing pressure into the anti-g pilot pants with increasing acceleration value in the case of positive acceleration.

BACKGROUND OF THE INVENTION

Such a device has been known from U.S. Pat. No. 4,546,491. Such devices are used to enable pilots or astronauts to withstand higher positive accelerations during flight maneuvers without an excessive accumulation of blood in the legs and consequently an excessive undersupply of blood in the head occurring, which may cause the pilot to faint during high positive acceleration. The term positive acceleration always pertains in connection with the present invention to the pilot who wears the control device and for whom a positive acceleration causes an increased weight pressing him into the pilot seat.

Positive accelerations of up to about +9 g, i.e., nine times the gravitational acceleration, can be currently reached with good life support systems in jet aircraft. This is possible if the pilot wears so-called anti-g pilot pants, which contain inflatable chambers that surround the legs, can be pressurized and exert an increased pressure on the legs of the pilot when the pressure values in the chambers increase in order to thus counteract a dilation of the blood vessels and an intense accumulation of blood in the legs of the pilot at high positive accelerations. To make it possible to admit pressure into the anti-g pilot pants as needed, control devices such as that described in U.S. Pat. No. 4,546,491 have been known, which hae an inlet for compressed gas and a controller outlet, which is to be connected to the anti-g pilot pants and at which an outlet pressure defined by the function of the controller is generated. The pressure at the controller outlet is set by the control device as a function of the positive acceleration experienced by the pilot and consequently by the control device worn by him. The pressure at the controller outlet is increased linearly with increasing positive acceleration as soon as the acceleration exceeds a threshold value of 1.8 g.

The prior-art control device operates with a pneumatic control branch, in which mass elements are provided, whose inertia is utilized to detect positive accelerations, wherein the mass elements are displaced against the force of a spring in order to thereby bring about pressure changes, which are ultimately transmitted to a control chamber of a main valve, as a result of which a pressure setting dependent on the displacement of the mass elements is achieved at the controller outlet. The transfer function of the control device, i.e., the pressure at the controller outlet as a function of the positive acceleration, is ultimately determined by the coordination of the spring constants, the mass of the mass elements, the dimensioning of throttle openings and pipe sections in the pneumatic controller.

The progressive development of modern jet aircraft, especially of military jets, has made it possible to fly flight profiles with computer controls, which range from negative accelerations to positive accelerations and rapid transitions from negative accelerations to high positive accelerations. However, it has been found that physiological problems arise for the pilots during a rapid change from negative to positive accelerations. This is explained especially by the fact that blood vessels in the upper part of the body, especially in the head, which are dilated at negative accelerations, very rapidly drain large amounts of blood into the lower part of the body at the time of a rapid transition to positive accelerations, so that there is a risk of a so-called "red out," i.e., the blood flows too rapidly from the brain of the pilot and the brain is no longer supplied with a sufficient amount of blood as a result, as a consequence of which the pilot becomes unconscious.

SUMMARY AND OBJECTS OF THE INVENTION

The primary object of the present invention is to improve a control device of the type described in the introduction such that flight maneuvers with rapid transitions from negative to positive accelerations become tolerable for pilots over a broader range than before.

According to the invention, a control device for admitting pressure into anti-g pilot pants is provided. The control device has a control branch for detecting positive accelerations and is designed to cause an admission of pressure into the anti-g pilot pants, with the pressure increasing with the increasing acceleration value during positive acceleration. The control device is provided according to the present invention with control means for detecting changes in acceleration from negative to positive values, which cause an additional admission of pressure over a limited period of time with a profile decreasing over time at rates of change in acceleration above a preset value. An additional admission of pressure into the anti-g pilot pants is brought about due to this design in the case of rapid load changes from negative to positive accelerations, so that an excessively rapid drainage of blood from the dilated blood vessels in the upper half of the body during such transitions can be counteracted by an additional admission of pressure over a limited period of time into the anti-g pilot pants by preventing blood from accumulating too rapidly in the lower half of the body by constricting the blood vessels by the additional admission of pressure into the anti-g pilot pants.

The control device is advantageously embodied with pneumatic control branches, which act via a valve control chamber on a main valve, which sets the pressure at the controller outlet.

In an advantageous embodiment, a second control branch may be present, which generates an overpressure in a storage chamber at negative accelerations, wherein an overpressure in the storage chamber acts on the first control branch for detecting positive accelerations and influences same as an increased positive acceleration in order to bring about an additional admission of pressure at the controller outlet as a result. The storage chamber is connected such that an overpressure generated in it has a predetermined time profile, e.g., via a drain line, which is provided with a throttle and is in connection with the atmosphere.

Due to the pneumatic control branches being coordinated with one another, it is possible to embody any desired transfer functions of the control device in order to generate the desired pressure curves at the time of transitions from negative to positive accelerations. In particular, it is possible to preset a rate of change in acceleration above which an additional admission of pressure shall be performed.

For example, the second control branch for detecting negative accelerations may have a mass element, which is displaced against the force of a spring during negative acceleration in order to increase the pressure in the storage chamber via a one-way valve, wherein the storage chamber is connected to the atmosphere via a throttle. The storage chamber acts on the first control branch for detecting positive accelerations in the same way as an additional positive acceleration, so that an additional admission of pressure is generated at the time of transition to positive accelerations.

For example, the first control branch for detecting positive accelerations may have a mass element, which is displaced by the force of a spring during positive acceleration and is suspended with a sealing membrane in the storage chamber such that an overpressure in the storage chamber leads to a displacement of the mass element against the spring and thus to a state as occurs during increased positive acceleration.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
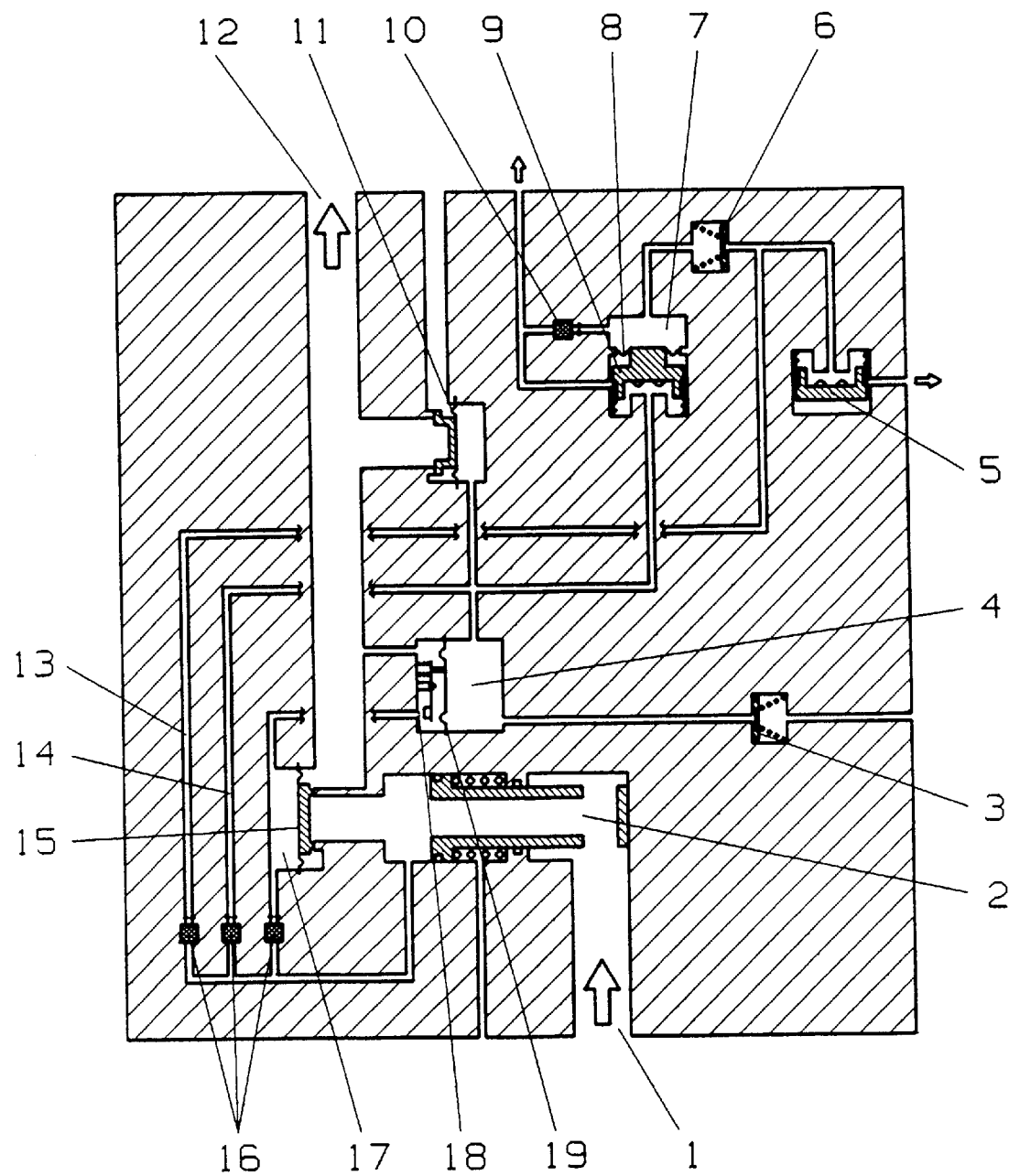
FIG. 1 is a schematic sectional view of the control device according to the invention.

Referring to the drawings in particular, the control device shown in FIG. 1 has a pressure supply line 1, via which it is supplied with compressed air. The pressure of the compressed air fed in is limited in a pressure reducer 2 to a suitable working pressure.

The main valve 15 following the pressure reducer 2 sets the pressure at the controller outlet 12.

A first control branch with a first control line 14 behind a filter/throttle combination 16 for flow limitation is directly connected to a valve control chamber 4, a vent valve 11 and a safety valve 3 for limiting the pressure. The control pressure generated in the control line 14 is admitted directly to the control membrane 19 in the control chamber 4, to which membrane the controller outlet pressure is admitted. As soon as the pressure at the controller outlet 12 is lower than the control pressure/pressure set point, the servo valve 18 is opened, as a result of which the pressure in the servo line 17 behind the filter/throttle combination 16 collapses and the main valve 15 opens until the pressure equalization between the controller outlet 12 and the control chamber 4 is achieved and the servo valve 18 closes.

The first control branch is also provided with a mass element 9, which is used to detect positive accelerations. The mass element 9 is pressed against the force of a spring, in the downward direction in FIG. 1, during positive accelerations, as a result of which the first control branch is throttled and the control pressure generated as a result is passed on to the main valve 15 via the control chamber 4. The main valve 15 remains open until the pressure at the controller outlet 12 increases to the control pressure. The control pressure decreases in the first control branch and the pressure at the controller outlet 12 is reduced via the vent valve 11 when the positive acceleration is eliminated.

No pressure builds up in a second control branch with the control line 13 behind a filter/throttle combination 16 during positive acceleration, which was described before for the first control branch. However, a mass element 5 in the second control branch is pressed upward against the force of a spring during negative acceleration values, and it throttles the second control branch. The control pressure generated as a result is transmitted into a storage chamber 7 via a one-way valve 6, e.g., a nonreturn valve. Part of the amount of gas fed in escapes via a filter/throttle combination 10 and an outlet line, which communicates with the environment; however, the amount of escaped gas is compensated due to inflow via the one-way valve 6 as long as this valve is open. The overpressure in the storage chamber 7 acts on the mass element 9 of the first control branch for positive accelerations via an intermediate membrane 8, and it acts on this mass element 9 as an additional positive acceleration by pressing the mass element 9 downward against the force of a spring.

By correspondingly coordinating and designing the individual elements of the first and second control branches and especially by the design of the springs, the shape of the membrane 8, the shape of the storage chamber 7 and its connection to the ambient atmosphere, it is possible to embody any desired transfer function, with which the control device responds to a change in acceleration from negative to positive values, and thus to embody a desired pressure curve decreasing over time with an additional admission of pressure during such a change from negative to positive accelerations.

While a specific embodiment of the invention has been shown and described in detail to illustrate the application of the principles of the invention, it will be understood that the invention may be embodied otherwise without departing from such principles.

What is claimed is:

1. A control device for admitting pressure into anti-g pilot pants, comprising:

a control branch for detecting positive accelerations and for causing an admission of pressure into the anti-g pilot pants increasing with the increasing acceleration value during positive acceleration; and a control means for detecting a change in acceleration from negative to positive values at rates of change in acceleration above a predetermined value and for inducing an additional admission of pressure into the anti-g pilot pants with a pressure profile decreasing over time in response to said acceleration from negative to positive values at rates of change in acceleration above the predetermined value.

2. The control device in accordance with claim 1, further comprising: a control chamber, a controller outlet and a main valve wherein said control branch is a pneumatic control branch cooperating with other pneumatic control branches, said pneumatic control branches acting via said valve control chamber on said main valve, which sets a pressure at said controller outlet.

3. The control device in accordance with claim 2, further comprising a storage chamber wherein said control means includes another control branch which generates an overpressure in said storage chamber during negative accelerations, and the overpressure acts on said control branch for detecting positive accelerations and brings said control branch into a state as in the case of increased positive acceleration in order to bring about an additional admission of pressure at said controller outlet, wherein said storage chamber is connected such that an overpressure decreases in said storage chamber with a predetermined profile over time.

4. The control device in accordance with claim 3, wherein said second control branch has a mass element, which is displaced during negative acceleration because of its inertia against the force of a spring in order to increase the pressure in said storage chamber via a one-way valve, wherein said storage chamber is connected to the atmosphere via a throttle, so that an overpressure built up decreases according to a curve predetermined by the characteristics of said throttle, and wherein an overpressure in said storage chamber acts on said control branch for detecting positive accelerations in the same manner as an additional positive acceleration.

5. The control device in accordance with claim 4, wherein said control branch for detecting positive accelerations has a mass element, which is displaced against the force of a spring during positive acceleration in order to bring about an increase in pressure in a valve control chamber of said main valve as a result and consequently an increase in pressure at said controller outlet, and said mass element is suspended with a sealing membrane in said storage chamber such that an overpressure in said storage chamber leads to a displacement of the mass element against the force of a spring.

6. A control device for admitting pressure into anti-g pilot pants, comprising:

a control chamber;

a controller outlet;

a main valve;

a control branch for detecting positive accelerations and for causing an admission of pressure into the anti-g pilot pants increasing with the increasing acceleration value during positive acceleration, said control branch being a pneumatic control branch, said pneumatic control branches acting via said control chamber on said main valve, which sets a pressure at said controller outlet; and a control means for detecting a change in acceleration from negative to positive values at rates of change in acceleration above a predetermined value and for inducing an additional admission of pressure into the anti-g pilot pants with a pressure profile decreasing over time in response to said acceleration from negative to positive values at rates of change in acceleration above the predetermined value.

7. The control device in accordance with claim 6, further comprising a storage chamber wherein said control means includes another control branch which generates an overpressure in said storage chamber during negative accelerations, and the overpressure acts on said control branch for detecting positive accelerations and brings said control branch into a state as in the case of increased positive acceleration in order to bring about an additional admission of pressure at said controller outlet, wherein said storage chamber is connected such that an overpressure decreases in said storage chamber with a predetermined profile over time.

8. The control device in accordance with claim 7, wherein said second control branch has a mass element, which is displaced during negative acceleration because of its inertia against the force of a spring in order to increase the pressure in said storage chamber via a one-way valve, wherein said storage chamber is connected to the atmosphere via a throttle, so that an overpressure built up decreases according to a curve predetermined by the characteristics of said throttle, and wherein an overpressure in said storage chamber acts on said control branch for detecting positive accelerations in the same manner as an additional positive acceleration.

9. The control device in accordance with claim 8, wherein said control branch for detecting positive accelerations has a mass element, which is displaced against the force of a spring during positive acceleration in order to bring about an increase in pressure in a valve control chamber of said main valve as a result and consequently an increase in pressure at said controller outlet, and said mass element is suspended with a sealing membrane in said storage chamber such that an overpressure in said storage chamber leads to a displacement of the mass element against the force of a spring.

* * * * *

UNITED STATES PATENT AND TRADEMARK OFFICE
CERTIFICATE OF CORRECTION

PATENT NO. : 5,961,442
DATED : October 5, 1999
INVENTOR(S) : MECKES

It is certified that error appears in the above-indentified patent and that said Letters Patent is hereby corrected as shown below:

read:
```
      On the title page, item [54] and in column 1, lines 1-2 title should
      CONTROL DEVICE FOR ADMITTING PRESSURE INTO ANTI-G
      PILOT PANTS
```

Signed and Sealed this

Fourth Day of April, 2000

Attest:

Q. TODD DICKINSON

Attesting Officer

*Director of Patents and Trademarks*